Nov. 17, 1931.  O. R. WIKANDER  1,832,439
RING SPRING
Filed Sept. 21, 1925   2 Sheets-Sheet 1
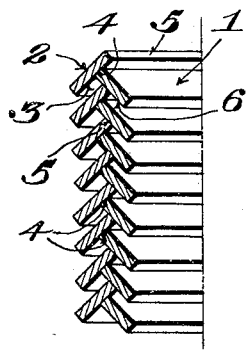
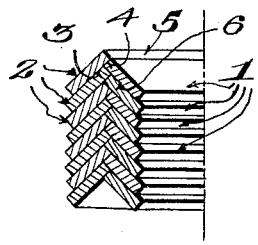
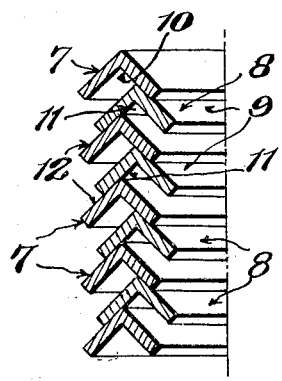
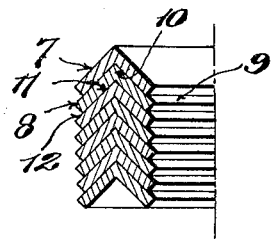
Inventor
Oscar R. Wikander

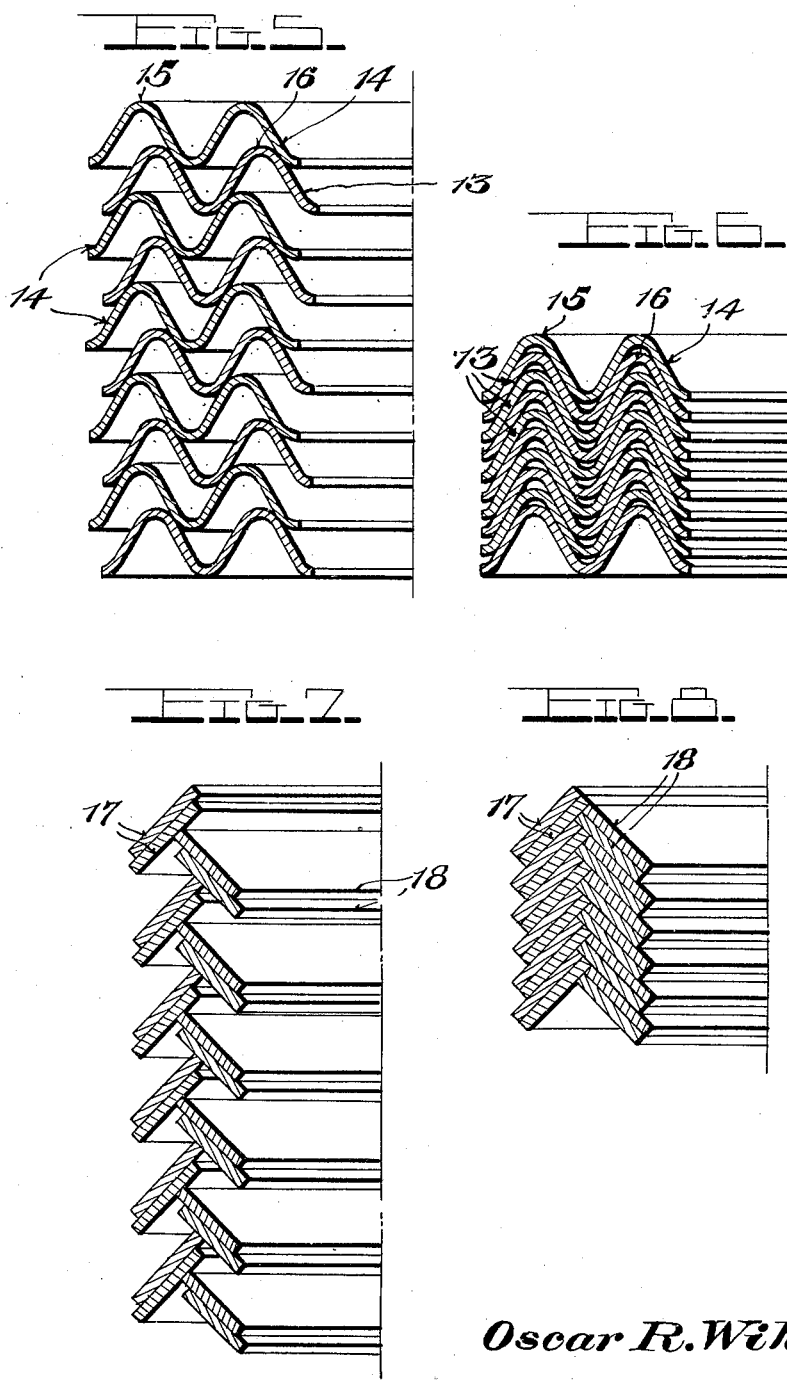

Patented Nov. 17, 1931

1,832,439

UNITED STATES PATENT OFFICE

OSCAR R. WIKANDER, OF PITTSBURGH, PENNSYLVANIA

RING SPRING

Application filed September 21, 1925. Serial No. 57,701.

This invention relates to a spring, more particularly to a spring of the ring or closed annulus type, the same being designed for cushioning heavy or large compressive strains.

Springs, comprising two telescopical, integrally closed annuli, are known in which the elements present complemental tapered friction surfaces, the taper being of such a degree as to permit compression of the component parts in response to an external force. This type of spring, having complemental as well as oppositely tapered friction faces, have said faces located at the same distance from the center line or axis of the spring and symmetrically arranged with respect to a transverse plane through the center of each ring. Such construction limits the travel of the spring to a fraction of the solid height of the same to prevent the adjacent rings from moving out of contact with each other, which latter action would derange the cooperating spring elements.

The primary object of this invention is to provide a spring of the general type above set forth in which the oppositely tapered surfaces of each ring are unsymmetrical to any transverse plane through the spring, and in which the travel of the spring is equal to its solid height.

The invention further resides in the salient features of construction and the arrangement and combination of parts of the spring hereinafter described in detail and succinctly defined in the appended claims, reference being had to the accompanying drawings wherein Figure 1 is a fragmentary longitudinal section through a spring constructed in accordance with the present invention, the spring being shown in its expanded or relaxed position;

Fig. 2 is a similar view showing the spring fully compressed;

Fig. 3 is a fragmentary longitudinal section through a slightly modified construction of spring;

Fig. 4 is a similar view depicting the spring fully compressed;

Fig. 5 is a view similar to Fig. 3 of a further modified spring construction in which the spring is shown relaxed;

Fig. 6 is a longitudinal section similar to Fig. 5 depicting the spring in its compressed state;

Fig. 7 illustrates a further modification in its expanded condition; and

Fig. 8 is a similar view showing the spring fully compressed.

Referring more in detail to the accompanying drawings, the numeral 1 designates the inner ring or closed annulus and 2 the outer closed ring or annulus, the latter being conically tapered and presenting an upwardly and inwardly inclined bottom face 3 with which the relatively short outer edge 4 of the inner ring 1 engages. Each spring element is of band or strip-like form of rectangular cross section whereby the outer edge of the outwardly flaring inner ring 1 will ride on the inner side face of the outer ring 2 and the inner edge 5 of the latter will ride on the outer side face 6 of the inner ring 1. It will thus be observed that the flat edges 4 and 5 are in full contact with the longer flat faces 3 and 6. This flat engagement remains in contact throughout any expansion and contraction or compression of the spring. The fully compressed spring is depicted in Fig. 2 from which it will be noted that the travel of the spring is equal to its solid height.

In the embodiment shown in Fig. 3 each ring is of inverted V form the outer rings 7 being of greater diameter than the inner rings 8 whereby the upper inner face 9 of the latter is in flat sliding contact with the lower inner face 10 of the outer ring 7, and the lower outer face 11 of the inner ring is in like engagement with the upper outer face 12 of the outer ring 7. It will thus be observed that the rings are alternately subjected to expansion and compression when the spring is compressed, thereby causing respectively tensile and compressing strains. In this construction the travel of the spring is also equal to its solid height, and when fully compressed, as shown in Fig. 4, the several rings assume the identical shape.

In the form shown in Fig. 5 the section of each ring is of a double wave or corrugation, every other ring 13 being subjected to tensile stresses while the alternate or outer rings 14 are subjected to compression stresses. The corrugations 15 and 16 are shown as being of similar formation and when the spring is fully compressed the several ring elements completely nest one within the other or assume the same shape.

The strength of the springs may be varied correspondingly by multiplying all or part of the spring rings, such as for example in Fig. 7. In this view, the spring is composed of the same kind of rings as the spring construction in Fig. 1, but two tensile rings 17 alternate with two compression rings 18, whereby the ultimate force of the spring is about doubled while the travel has been decreased to about one-half. This is evident from Fig. 8 in which the spring is fully compressed, the two tensile rings bearing solidly upon each other and the compression rings bearing the same relation to each other.

What is claimed is:—

1. A spring comprising a series of telescopical elastic rings each having at least two friction faces, inclined at an angle to each other, said friction faces of each ring engaging the friction faces of adjacent rings at opposite sides thereof.

2. A spring comprising a plurality of outer, conical annuli, a plurality of inner, flaring annuli, each of rectangular cross section with the upper narrow edges of the annuli bearing on the lower side faces of the adjacent annuli.

3. A spring according to claim 1, the section of each annulus being a quadrangle, the short side of one annulus coating with the long side of the adjacent annulus.

4. A spring according to claim 1, in which each annulus is flat in cross-section.

5. A spring comprising coaxially arranged sets of telescopical elastic annuli, each annulus having an inner bearing face and an outer bearing face, the inner and outer bearing faces of the sets alternately engaging each other throughout the sets.

6. A spring comprising inner and outer sets of annuli, each annulus having a short bearing face and a longer bearing face, the short bearing faces of one set having sliding contact with the longer bearing faces of the other set.

7. A spring comprising a set of outer conical rings and a set of inner conical rings, each ring having a pair of relatively inner and outer bearing surfaces extending at an angle to each other, said inner and outer bearing surfaces of the rings alternating in arrangement with each other throughout.

8. In a ring spring, an elastic annulus having an outer inclined friction face and an inner inclined friction face.

9. In a ring spring, an elastic annulus having an outer inclined friction face and an inner inclined friction face, said friction faces being parallel with each other.

10. In a ring spring, an elastic annulus having two friction faces, both inclined to its axis.

11. In a ring spring, an elastic annulus comprising a body of substantially uniform wall thickness and presenting outer and inner inclined faces lying in parallel planes.

12. In a ring spring, an elastic annulus having two friction surfaces inclined to its axis for coaction with similar surfaces of cooperating annuli.

13. In a ring spring, an elastic annulus having a lateral friction face and a marginal edge friction face, both inclined to its axis.

14. In a ring spring, inner and outer sets of elastic rings, each having an inner inclined face and an outer inclined face, the inner and outer inclined faces of successive rings alternately engaging each other throughout the sets of rings.

15. A ring spring comprising inner and outer ring members having friction engaging surfaces adapted to permit collapsing of the ring to an extent equal to its solid height.

In testimony whereof I affix my signature.

OSCAR R. WIKANDER.